3,729,474
N-(ARYL-LOWER ALKYL)-N'-PHENYL-
PIPERAZINES AND SALTS
Anton Mentrup, Karl Zeile, Peter Danneberg, and Kurt Schromm, Ingelheim (Rhein), Germany, assignors to Boehringer Ingelheim G.m.b.H., Ingelheim (Rhine), Germany
No Drawing. Continuation of abandoned application Ser. No. 663,973, Aug. 29, 1967. This application Jan. 28, 1971, Ser. No. 110,766
Claims priority, application Germany, Sept. 3, 1966, B 88,772; Aug. 1, 1967, B 93,758
Int. Cl. C07d
U.S. Cl. 260—268 BC
16 Claims

ABSTRACT OF THE DISCLOSURE

Racemic and optically active N-(1-bicyclic arylpropyl-2)-N'-phenyl-piperazines of the formula

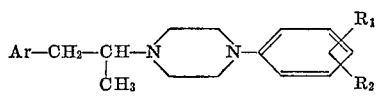

wherein Ar is 3,4-methylenedioxy-phenyl, indanyl, naphthyl or 1,4-benzodioxanyl, and $R_1$ and $R_2$ are each hydrogen, halogen, amino, acetylamino, trifluoromethyl, alkyl of 1 to 4 carbon atoms, alkoxy of 1 to 4 carbon atoms, alkylcarbonyl of 1 to 4 carbon atoms or alkylthio of 1 to 4 carbon atoms, and non-toxic, pharmacologically acceptable acid addition salts thereof; the compounds are useful as central nervous system depressants.

This is a continuation of copending application Ser. No. 663,973, filed Aug. 29, 1967, now abandoned.

This invention relates to novel N-(1-bicyclic arylpropyl-2)-N'-phenyl-piperazines and their acid addition salts, as well as to various methods of preparing these compounds.

More particularly, the present invention relates to compounds of the formula

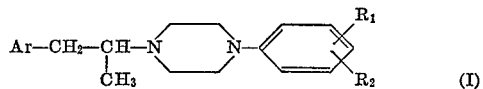   (I)

wherein

Ar is bicyclic fused-ring aryl, where the ring not directly attached to the propyl grouping is an isocyclic or heterocyclic saturated or aromatic ring, such as 3,4-methylenedioxy-phenyl, indanyl, naphthyl or 1,4-benzodioxanyl, and $R_1$ and $R_2$, which may be identical to or different from each other, are each hydrogen, halogen, amino, acetylamino, trifluormethyl, alkyl of 1 to 4 carbon atoms, alkoxy of 1 to 4 carbon atoms, alkylcarbonyl of 1 to 4 carbon atoms or alkylthio of 1 to 4 carbon atoms, and their non-toxic, pharmacologically acceptable acid addition salts.

The compounds accordinng to the present invention may be prepared by a number of different methods involving well known chemical principles, among which the following have proved to be particularly convenient and efficient:

METHOD A

By introducing a 1-aryl-propyl-(2)- radical, where the aryl moiety corresponds in structure to the Ar-substituent in Formula I, into the N'-position of an N-phenyl-piperazine of the formula

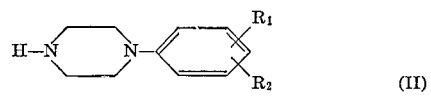   (II)

wherein $R_1$ and $R_2$ have the same meanings as in Formula I, pursuant to customary methods, preferably by reacting a compound of the Formula II with an electrophilic 1-aryl-propyl-(2) compound, such as a 1-aryl-propyl(2)-chloride or -bromide or an alkylsulfonic or arylsulfonic acid ester of a 1-aryl-propanol(2), in the presence of an acid-binding agent; or by reacting a compound of the Formula II with a 1-aryl-propanone-(2) in the presence of catalytically activated hydrogen.

METHOD B

By hydrogenating an N-(1-bicyclic aryl-1-halo-propyl-2)-N'-phenyl-piperazine of the formula

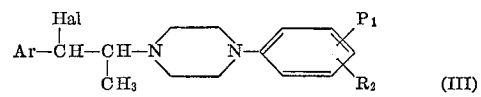   (III)

wherein $R_1$, $R_2$ and Ar have the same meanings as in Formula I, and Hal is chlorine, bromine or iodine, preferably chlorine, with catalytically activated hydrogen.

METHOD C

By Reacting a compound of the formula

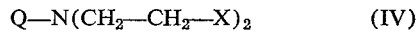   (IV)

wherein Q is

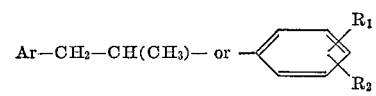

where Ar, $R_1$ and $R_2$ have the same meanings as in Formal I, and X is a substituent which may easily anionically be removed, such as halogen, alkylsulfonyloxy or arylsulfonyloxy, with a primary amine of the formula

   (V)

wherein $Q_1$ has the same meanings as Q, but must be different from Q.

METHOD D

By alkylating an N,N'-disubstituted ethylene-diamine of the formula

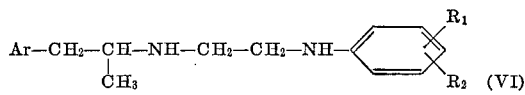   (VI)

wherein Ar, $R_1$ and $R_2$ have the same meanings as in Formula I, with a di-substituted ethane of the formula

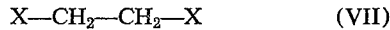   (VII)

wherein X has the same meanings as in Formula IV, preferably with a diahaloethane, especially dibromoethane.

Mehods B through D above are advantageously performed at elevated temperatures and in the presence of an acid-binding agent.

METHOD E

By reducing a compound of the formula

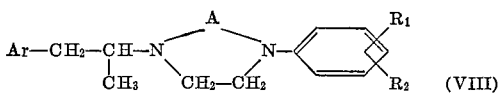   (VIII)

wherein Ar, $R_1$ and $R_2$ have the same meanings as in Formula I and A is —CO—CH$_2$— or —CH$_2$—CO—, with a complex metal hydride, such as lithium aluminum hydride, provided that, other than A, compound VIII contains no other groupings which are reducible by means of the particular complex metal hydride which is employed.

METHOD F

By converting a compound of the formula

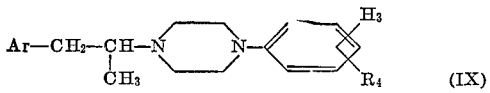

wherein Ar has the same meanings as in Formula I, and $R_3$ and/or $R_4$ are substituents which may readily be converted into substituents $R_1$ and $R_2$ in Formula I by customary methods, into the corresponding compound of the Formula I in known fashion. One of $R_3$ and $R_4$ may also have the meanings of $R_1$ and $R_2$ in Formula I.

Thus, for example, a compound of the Formula IX wherein $R_3$ and/or $R_4$ are nitro may be converted by catalytic reduction into the corresponding compound of the Formula I wherein $R_1$ and/or $R_2$ are amino which, in turn, may be converted into the corresponding compound of the Formula I wherein $R_1$ and/or $R_2$ are halogen or cyano by diazotisation and heating with a cuprous halide or cuprous cyanide. Alternatively, a compound of the Formula I wherein $R_1$ and/or $R_2$ are amino may be converted into the corresponding compound wherein $R_1$ and/or $R_2$ are acylamino by acylating the former with an acid halide or acid anhydride, such as acetyl chloride or acetic anhydride.

Finally, a compound of the Formula I wherein $R_1$ and/or $R_2$ are alkoxy of 1 to 4 carbon atoms may be obtained by reacting a corresponding compound of the Formula IX wherein $R_3$ and/or $R_4$ are hydroxy with an alkylating agent, such as an alkyl halide, dialkylsulfate or diazoalkane.

METHOD G

For the preparation of a compound of the Formula I wherein Ar is 1,4-benzodioxanyl or 3,4-methylenedioxyphenyl by reacting a compound of the formula

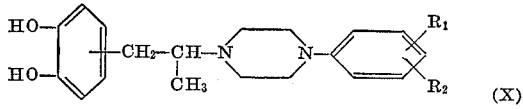

wherein $R_1$ and $R_2$ have the same meanings as in Formula I, with a compound of the formula $$X-CH_2)_n-X \qquad (XI)$$

wherein X has the same meanings as in Formula IV, preferably halogen, and $n$ is an integer from 1 to 2, inclusive, advantageously in the presence of an acid-binding agent and at moderately elevated temperatures.

The majority of the starting compounds required for methods A through G are known compounds, and those which have heretofore not been specifically described in the literature may readily be prepared by customary methods described in current chemical handbooks, such as Houben-Weyl, 1st and 2nd editions.

Thus, for example, a compound of the Formula II may be prepared by the processes described in J.A.C.S., 76, 1853 (1954) and J. Med. Chem., 8, 332 (1965). An electrophilic 1-arylpropyl-(2) compound may be obtained by esterification of the corresponding 1-arylpropanol-(2), as illustrated in Example 1 below, and 1-arylpropanone-(2), may be obtained by the process described in Org. Synth. Coll., vol. IV, p. 573.

A compound of the Formula III may be prepared by reducing a corresponding N-[1-aryl-1-oxo-propyl-(2)]-N'-(substituted phenyl)-piperazine (obtained by reacting a 1-aryl-2-bromo-propanone-(1) with an N-(substituted phenyl)-piperazine) according to the process described in Japanese Pat. 23,412/64, and halogenating the intermediate N-[1-aryl-1-hydroxy-propyl-(2)]-N'-(substituted phenyl)-piperazine obtained thereby pursuant to customary methods, such as with $SOCl_2$ as described in German Auslegeschrift 1,21,973, or with $PCl_5$ as described in J. Chem. Soc. (London), 1963, p. 1385, and illustrated in Example 4 below.

Starting compounds of the Formulas IV, V and VI may be obtained by the methods described in German Auslegeschrift 1,212,973, while compounds of the Formulas VII and XI may be prepared by esterification of the corresponding glycols, or by addition of halogen to the corresponding alkanes, or by replacement of hydrogen by the halogen in the corresponding alkanes.

A starting compound of the Formula VIII may, for example, be obtained by the process described in J. Med. Chem. 7, 154–158 (1964).

Finally, a starting compound of the Formula IX may be prepared by method A above, except that phenyl substituents $R_1$ and $R_2$ in compound II should be the desired substituted $R_3$ and $R_4$, as defined in connection with Formula IX.

The compounds of the present invention comprise an asymmetric carbon atom in the —CH($CH_3$)— grouping and consequently exist in the form of racemic mixtures as well as optically active antipodes. Racemic mixtures are obtained by starting from the racemic mixtures of the starting compounds containing the —CH($CH_3$)— grouping. The optically active antipodes may be obtained either by starting with the corresponding optically active starting compound containing the asymmetric carbon grouping, or by converting the racemic mixture of the end product into its diasteromeric salt with the aid of optically active auxiliary acids, such as dibenzoyl-D-tartaric acid or bromocamphor-sulfonic acid, and separatng the optical antipodes by fractional precipitation or fractional crystalization of the diasteromeric salt.

The compounds embraced by Formula I above are organic bases and therefore form acid addition salts with inorganic and organic acids. Such acid addtition salts may be obtained in customary fashion, that is, by dissolving the free base in a suitable solvent and acidifying the solution with the desired inorganic or organic acid. Examples of non-toxic, pharmacologically acceptable acid addition salts are those formed with hydrochloric acid, hydrobromic acid, sulfuric acid, methanesulfonic acid, succinic acid, tartaric acid, 8-chlorotheophylline or the like.

The following examples further illustrate the present invention and will enable others skilled in the art to understand it more completely. It should be understood, however, that the invention is not limited solely to the particular examples given below.

EXAMPLE 1

Preparation of N - [1-(3,4-methylenedioxy-phenyl)-propyl-(2) 7-N'-(o-ethyl-phenyl)-piperazine by method A (a) 1-(3,4-methylenedioxy-phenyl)-propyl-(2)-p-toluenesulfonate.—107 gm. of 1-(3,4-methylenedioxy-phenyl)-propanone-(2) were reduced in ethanol with 14.2 gm. of sodium borohydride, yielding 1-(3,4-methylenedioxy-phenyl)-propanol-(2), B.P. 153–156° C. at 14 mm. Hg, which was reacted with p-toluenesulfochloride in pyridine to yield 1-(3,4-methylenedioxy-phenyl)-propyl-(2)-p-toluenesulfonate, M.P. 58° C.

(b) N - [1-(3,4 - methylenedioxy-phenyl)-propyl-(2)]-N'-(o-ethyl-phenyl)-piperazine.—A mixture of 70 gm. (0.21 mol) of 1-(3,4-methylenedioxy-phenyl)-propyl-(2)-p-toluenesulfonate, 80 gm. (0.42 mol) of N-(o-ethylphenyl)-piperazine and 350 cc. of anisole was refluxed for four hours. Thereafter, the anisole was distilled off, and the residue was admixed with 700 cc. of water. The crystalline precipitate formed thereby was collected by vacuum filtration, admixed with ammonia, the alkaline mixture was extracted with ether, and the ether was evaporated from the extract solution, yielding the free base N-[1-(3,4-methylenedioxy - phenyl) - propyl - (2)] - N'-(o-ethyl-phenyl)-piperazine. The free base was dissolved in acetonitrile, the solution was acidified with aqueous hydrochloric acid, and the precipitate was collected and recrystallized from methanol, yielding the monohydrochloride of the free base, M.P. 277° C., of the formula

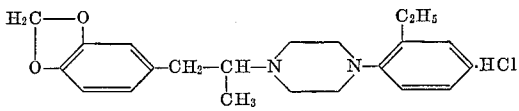

EXAMPLE 2

Preparation of N-[1-(3,4-methylenedioxy-phenyl)-propyl-(2)] - N' - (o,o' - dimethyl-phenyl)-piperazine and its hydrochloride by method A 33.8 gm. (0.1 mol) of 1-(3,4-methylenedioxy-phenyl)-propanol-(2)-p-toluenesulfonate, M.P. 58° C., were admixed with 170 cc. of anisole and 0.2 mol of N-(o,o'-dimethylphenyl)-piperazine, and the mixture was refluxed for four hours. Thereafter, the anisole was distilled off, the residue was admixed with about 300 cc. of water, the aqueous solution was acidified with hydrochloric acid, and then ether was added. The precipitate formed thereby was collected by vacuum filtration, admixed with ammonia, the alkaline mixture was extracted with ether, and the ether was evaporated from the extract solution, yielding the free base N-[1-(3,4 - methylenedioxy - phenyl)-propyl)-(2)] - N'-(o,o' - dimethylphenyl)-piperazine. The free base was dissolved in ethanol, the solution was acidified with aqueous hydrochloric acid, and the precipitate formed thereby was collected and recrystallized from methanol, yielding the hydrochloride and the free base, M.P. 240–250° C., of the formula

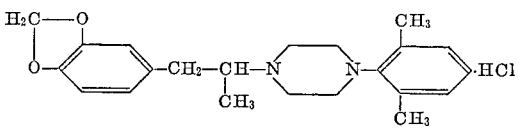

EXAMPLE 3

Using a procedure analogous to that described in Example 1, N-[1-(3,4-methylenedioxy-phenyl)-propyl-(2)]-N' - (o - methoxyphenyl) - piperazine, M.P. 98° C. (recrystallized from isopropanol), of the formula

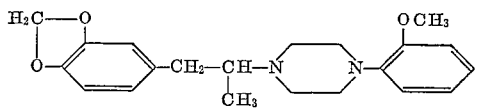

was prepared from 1-(3,4-methylenedioxy - phenyl)-propanol-(2)-p-toluenesulfonate and N-(o-methoxyphenyl)-piperazine.

Its monohydrochloride had a melting point at 247° C.

EXAMPLE 4

Preparation of N-[1-(5'-indanyl)-propyl-(2)] - N' - (o-ethyl-phenyl)-piperazine hydrochloride by method B (a) N-[1-(5' - indanyl) - 1 - chloropropyl-(2)-N'-(o-ethylphenyl) - piperazine dihydrochloride.—76 gm. (0.3 mol) of 1-(5-indanyl)-2-bromopropanone-(1) were admixed with 1140 cc. of benzene and 114 gm. of N-(o-ethyl-phenyl)-piperazine, and the mixture was refluxed for several hours. The free base N-[1-(5'-indanyl) - 1 - oxo-propyl-(2)] - N' - (o-ethylphenyl)-piperazine, M.P. 114° C., formed thereby was isolated from the reaction mixture. 79 g. of this free base were reduced with 3.7 gm. of sodium borohydride in ethanol, yielding N-[1-(5'-indanyl) - 1 - hydroxy-propyl - (2)]-N'-(o-ethyl-phenyl)-piperazine, which was isolated in the form of its monohydrochloride, M.P. 257° C., and converted into the free base. 20 gm. of the free base thus obtained were chlorinated with 24 gm. of phosphorus pentachloride in 200 cc. of acetonitrile, yielding the dihydrochloride of N-[1-(5'-indanyl)-1-chloro-phenyl-propyl - (2)] N'-(o-ethyl phenyl)-piperazine, M.P. 190° C.

(b) N-[1-(5' - indanyl) - propyl - (2)] - N' - (o-ethyl-phenyl)-piperazine hydrochloride.—4.55 gm. of the dihydrochloride and product obtained in (a) above were dissolved in 45 cc. of methanol, 3.62 gm. of dimethylaniline and a small amount of Raney nickel were add to the solution, and the mixture was hydrogenated at atmospheric pressure. After working up the reaction mixture in conventional manner, a good yield of N-[1 - (5' - indanyl)-propyl-(2)] - N' - (o-ethyl-phenyl)-piperazine hydrochloride, M.P. 276–278° C., of the formula

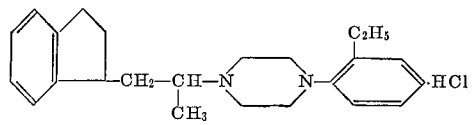

was obtained.

EXAMPLE 5

Preparation of N-[1-(β-naphthyl) - propyl-(2)]-N'-(o-ethylphenyl)-piperazine hydrochloride by method B (a) N-[1-(β-naphthyl) - 1 - chloro-propyl-(2)]-N'-(o-ethyl-phenyl)-piperazine monohydrochloride.—51 gm. of 1-(β-naphthyl)-2-bromo-propanone-(1) were admixed with 500 cc. of acetonitrile and 73.7 gm. of N-(o-ethylphenyl)-piperazine, and the mixture was refluxed for several hours. The reaction mixture was worked up in customary fashion, yielding N-[1-(β-naphthyl)-1-oxo-propyl-(2)]-N'-(o-ethyl-phenyl)-piperazine, M.P. 115–117° C., which was subsequently reduced with sodium borohydride in ethanol, yielding N-[1-(β-naphthyl)-1-hydroxy-propyl-(2)]-N'-(o-ethyl-phenyl)-piperazine, whose monohydrochloride had a melting point of 196–197° C.

(b) N-[1-(β-naphthyl)-propyl - (2)] - N' - (o-ethyl-phenyl)-piperazine hydrochloride.—25 gm. of the monohydrochloride and product obtained in (a) above were dissolved in 250 cc. of methanol, 21.1 gm. of dimethylaniline and a small amount of Raney nickel were added to the solution, and the mixture was hydrogenated at atmospheric pressure. After working up the reaction mixture in customary fashion, a good yield of N-[1-(β-naphthyl)-propyl-(2)]-N'-(o-ethyl - phenyl) - piperazine hydrochloride, M.P. 256° C., of the formula

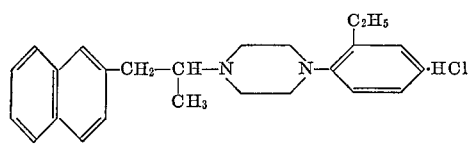

was obtained.

EXAMPLE 6

Preparation of N-[1-(3',4'-methylenedioxy - phenyl)-propyl-(2)] - N' - (o-butoxy-phenyl)-piperazine monohydrochloride by method A 1-(3',4'-methylenedioxy-phenyl)-propanol-(2) was reacted with methanesulfochloride in pyridine, 0.05 mol of the resulting 1-(3',4'-methylenedioxy-phenyl)-propyl-(2)-methanesulfonate was admixed with 0.1 mol of N-(o-butoxyphenyl)-piperazine and 100 cc. of toluene, and the mixture was refluxed until the reaction had gone to completion. The reaction mixture was worked up in customary manner, yielding N-[1-(3',4'-methylenedioxy-phenyl)-propyl-(2)]-N'-(o-butoxyphenyl)-piperazine dihydrochloride, M.P. 213–216° C., which was stirred with water to yield the corresponding monohydrochloride, M.P. 227–228° C. (recrystallized from acetonitrile), of the formula

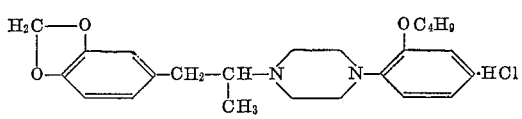

EXAMPLE 7

Using a procedure analogous to that described in Example 6, N-[1-(3',4'-methylenedioxy-phenyl)-propyl-(2)]-N'-(m-trifluormethyl-phenyl)-piperazine dihydrochloride, M.P. 198–200° C., of the formula

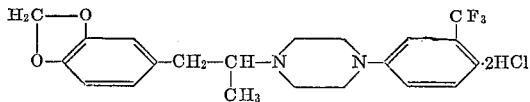

was prepared from 1-(3',4'-methylenedioxy-phenyl)-propyl-(2)-methanesulfonate and N-(m-trifluormethyl-phenyl)-piperazine.

The monohydrochloride had a melting point of 213° C.

EXAMPLE 8

Preparation of N-[1-(1,4-benzodioxanyl-6)-propyl-(2)]-N'-(o-ethyl - phenyl)-piperazine hydrochloride by method G A mixture of 7.5 gm. of N-[1-(3',4'-dihydroxy-phenyl)-propyl-(2)]-N'-(o-ethyl-phenyl)-piperazine, M.P. 135–137° C. (M.P. of monohydrochloride 219° C.), 4.15 gm. of ethylenebromide, 6.1 gm. of potassium carbonate and 58 cc. of dimethylformamide was refluxed for several hours. Thereafter, the reaction mixture was worked up in the usual manner, yielding N-[1-(1,4-benzodioxanyl-6)-propyl-(2)]-N'-(o-ethyl-phenyl)-piperazine dihydrochloride, M.P. 277–278° C., which was stirred with water and yielded the corresponding monohydrochloride, M.P. 290° C. (recrystallized from acetonitrile), of the formula

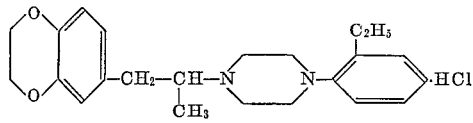

EXAMPLE 9

Preparation of N-[1-(3,4-methylenedioxy-phenyl)-propyl-(2)]-N'-(o - ethoxy-phenyl)-piperazine hydrochloride by method C 1-(3,4-methylenedioxy-phenyl)-isopropylamine was reacted with ethyleneoxide in a mixture of ethanol and water to form 1-(3,4-methylenedioxy-phenyl)-2-(bis-β-hydroxyethyl)-aminopropane, B.P. 160–165° C. at 0.03 mm. Hg, which was converted into its hydrochloride. The hydrochloride was then reacted with thionylchloride in acetonitrile to form 1-(3,4-methylenedioxy-phenyl)-2-(bis-β-chloroethyl)-aminopropane, whose hydrochloride had a melting point of 177° C.

A mixture of 8.5 gm. of the last-mentioned hydrochloride, 50 cc. of cyclohexanol, 3 gm. of o-ethylaniline and 10.3 gm. of potassium carbonate was refluxed for 4 hours, accompanied by stirring. Thereafter, the inorganic salts which had precipitated were separated by vacuum filtration and washed with ethanol, and the cyclohexanol was distilled off, leaving as a residue N-[1-(3,4-methylenedioxy-phenyl)-propyl-(2)] - N' - (o-ethoxy-phenyl)-piperazine, whose hydrochloride of the formula

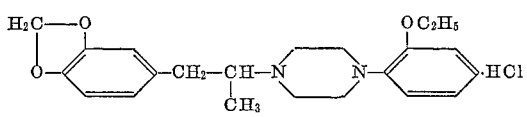

had a melting point of 277–278° C.

EXAMPLE 10

Preparation of N-[1-(3,4-methylenedioxy-phenyl)-propyl-(2)-N'-(o-ethyl-phenyl)-piperazine by method C 12.3 gm. of bis-β-chloroethyl-o-ethylphenyl-amine were admixed with 50 cc. of ethanol, 9 gm. of 1-(3,4-methylenedioxy-phenyl)isopropylamine and 13.8 gm. of potassium carbonate, and the mixture was refluxed for sixteen hours, while stirring. Thereafter, the reaction mixture was worked up as described in the preceding example, and the free base product was converted into its hydrochloride, yielding N-[1-(3,4 - methylenedioxy-phenyl)-isopropyl]-N'-(o-ethyl-phenyl)-piperazine hydrochloride, M.P. 277° C.

EXAMPLE 11

Preparation of N-[1-(3,4-methylenedioxy-phenyl)-propyl-(2)]-N'-(o-methyl-phenyl)-piperazine by method A Using a procedure analogous to that described in Example 6, N-[1-(3,4-methylenedioxy-phenyl)-propyl-(2)]-N' - (o-methyl-phenyl) - piperazine monohydrochloride, M.P. 285° C. (recrystallized from ethanol), was prepared from 25.8 gm. of 1-(3,4-methylenedioxy-phenyl)propanol-(2) methanesulfonic acid ester and 25.8 gm. of N-(o-methylphenyl)-piperazine.

EXAMPLE 12

Preparation of N-[1-(3,4-methylenedioxy-phenyl)-propyl-(2)]-N'-(p-methyl-phenyl)-piperazine by method A Using a procedure analogous to that described in Example 6, N-[1-(3,4-methylenedioxy-phenyl)-propyl-(2)]-N'-(p-methyl-phenyl)-piperazine, M.P. 92–93° C., was prepared from 25.8 gm. of 1-(3,4-methylenedioxy-phenyl)-propanol-(2) methanesulfonic acid ester and 25.8 gm. of N-(p-methyl-phenyl)-piperazine. Its monohydrochloride had a melting point of 253° C. (recrystallized from ethanol).

EXAMPLE 13

Preparation of N-[1-(3,4-methylenedioxy-phenyl)-propyl-(2)] - N' - phenyl) - piperazine monohydrochloride by method A Using a procedure analogous to that described in Example 6, N-[1-(3,4-methylenedioxy-phenyl)-propyl-(2)]-N'-phenyl-piperazine and its monohydrochloride, M.P. 224–225° C. (recrystallized from acetonitrile), were prepared from 1-(3,4-methylenedioxy-phenyl)-propanol-(2) methanesulfonic acid ester and N-phenyl-piperazine.

EXAMPLE 14

Preparation of N-[1-(3,4-methylenedioxy-phenyl)-propyl-(2)]-N'-(p-acetyl-phenyl)-piperazine by method A Using a procedure analogous to that described in Example 6, N-[1-(3,4-methylenedioxy-phenyl)-propyl-(2)]-N'-(p-acetyl-phenyl)-piperazine, M.P. 95° C., of the formula

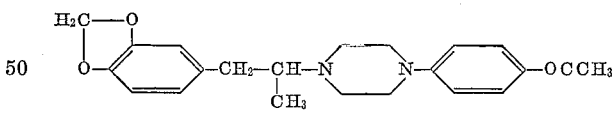

was prepared from 1-(3,4-methylenedioxy-phenyl)-propanol-(2) methanesulfonic acid ester and N-(p-acetyl-phenyl)-piperazine. Its monohydrochloride had a melting point of 238° (recrystallized from ethanol).

EXAMPLE 15

Preparation of N-[1-(3,4-methylenedioxy-phenyl)-propyl-(2)]-N'-(o-ethyl-phenyl)-piperazine by method D 0.05 mol of N-[1-(3,4 - methylenedioxy-phenyl)-propyl-(2)]-N'-(o-ethyl-phenyl)-ethylenediamine [B.P. 207° C. at 0.0075 mm. Hg; prepared by catalytic reduction of 1-(3,4-methylenedioxy-phenyl)-propanone-(2) and N-(o-ethyl-phenyl)-ethylenediamine] was admixed with 0.05 mol of ethylene bromide, 0.1 mol of potassium carbonate and 50 cc. of cyclohexanol, and the mixture was refluxed first for six hours on an oil bath at 140° C. bath temperature and then for eight hours at 180° C. external temperature. Thereafter, the inorganic salts which had precipitated out were collected by vacuum filtration and the cyclohexanol was distilled out of the filtrate. The residue was N-[1-(3,4-methylenedioxy-phenyl)-propyl-(2)]-N'-(o-ethyl - phenyl)-piperazine, whose monohydrochloride had a melting point of 279–280° C.

EXAMPLE 16

Preparation of N-[1-(3,4-methylenedioxy-phenyl)-propyl-(2)]-N'-(o-amino-phenyl)-piperazine and its hydrochloride by method F 41 gm. (0.101 mol) of N-[1-(3,4-methylenedioxyphenyl)-propyl-(2)]-N'-(o-nitro - phenyl)piperazine monohydrochloride [M.P. 232–234° C., prepared analogous to Example 6 from 1-(3,4-methylenedioxy-phenyl)-propanol-(2) methanesulfonic acid ester and N-(o-nitro-phenyl)-piperazine] were admixed with 820 cc. of methanol, 4 gm. of 10% palladized charcoal and 0.101 mol of aqueous hydrochloric acid, and the mixture was hydrogenated at a pressure of 5 atmospheres gauge and a temperature of 50–60° C. After the calculated amount of hydrogen had been absorbed, the catalyst was removed by vacuum filtration, and the filtrate was evaporated, yielding N-[1-(3,4-methylenedioxy - phenyl)-propyl-(2)]-N'-(o-amino-phenyl)-piperazine, whose dihydrochloride of the formula

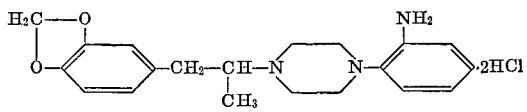

had a melting point of 302° C. (decomposition).

EXAMPLE 17

8.3 gm. of N-[1-(3,4-methylenedioxy-phenyl)-propyl-(2)]-N'-(o-amino-phenyl)-piperazine, obtained pursuant to Example 16, were admixed with 83 cc. of acetic acid anhydride, and the mixture was refluxed for thirty minutes. Thereafter, the excess unreacted acetic acid anhydride was distilled off, the residue was neutralized and dissolved in ethanol, and the solution was acidified with the calculated amount of ethereal hydrochloric acid. The precipitate formed thereby was collected and recrystallized from ethanol, yielding N-[1-(3,4-methylenedioxy-phenyl)-propyl-(2)]-N' - (o-acetamido - phenyl)-piperazine monohydrochloride, M.P. 264° C., of the formula

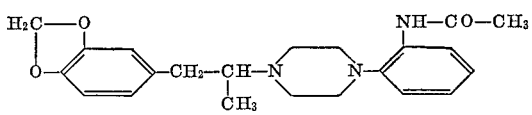

EXAMPLE 18

Preparation of N-[1-(3,4-methylenedioxy-phenyl)-propyl-(2)]-N'-(o-chloro-phenyl)-piperazine by method A Using a procedure analogous to that described in Example 6, N-[1-(3,4-methylenedioxy-phenyl)-propyl-(2)]-N'-(o-chloro-phenyl) - piperazine monohydrochloride, M.P. 242° C. (recrystallized from ethanol), was prepared from 25.8 gm. of 1-(3,4-methylenedioxyphenyl)-propanol-(2) methanesulfonic acid ester and 25.8 gm. of N-(o-chlorophenyl)-piperazine.

The compounds according to the present invention, that is, racemic mixtures of those embraced by Formula I above, the optically active antipode components of said racemic mixture and the non-toxic, pharmacologically acceptable acid addition salts of said racemates or optically active antipodes, have useful pharmacodynamic properties. More particularly, they exhibit central nervous system depressing activities, coupled with very low toxicity, in warm-blooded animals, such as mice, dogs and rabbits; thus, they are effective as sedatives, neuroleptics and tranquilizers. Particularly effective in this respect are compounds of the Formula I wherein $R_1$ is hydrogen and $R_2$ is alkyl of 1 to 4 carbon atoms and specifically N-[1-(3,4-methylenedioxy-phenyl)-propyl-(2)] - N'-(o-methyl-phenyl)-piperazine and its non-toxic acid addition salts, N-[1-(3,4-methylenedioxy-phenyl)-propyl - (2)] - N'-(p-methyl-phenyl)-piperazine and its non-toxic acid addition salts, N-[1-(3,4-methylenedioxy-phenyl)-propyl-(2)]-N'-(o-ethyl-phenyl)-piperazine and its non-toxic addition salts, N - [1-(5-indanyl)-propyl-(2)]-N-(o-ethyl)-phenyl)piperazine and its non-toxic acid addition salts, and N-[1-(β-naphthyl)-propyl-(2)][N'-(o - ethyl - phenyl)-piperazine and its non-toxic acid addition salts.

For pharmaceutical purposes, the compounds according to the present invention are administered to warm-blooded animals perorally or parenterally as active ingredients in conventional dosage unit compositions, that is, compositions in dosage unit form consisting essentially of an inert pharmaceutical carrier and one dosage unit of the active ingredient, such as tablets, coated pills, wafers, capsules, solutions, suspensions, emulsions, syrup, suppositories or the like. One dosage unit of the compounds according to the present invention is from 0.25 to 3.4 mgm./kg. body weight, preferably from 0.41 to 1.4 mgm./kg. body weight. A dosage unit composition comprising a compound of the instant invention as an active ingredient may also contain one or more other active ingredients, such as other hypnotics, neuroleptics, spasmolytics, antiphlogistics and/or CNS depressants.

The following examples illustrate a few dosage unit compositions comprising a compound according to the instant invention as an active ingredient and represent the best mode contemplated of putting the present invention to practical use. The parts are parts by weight unless otherwise specified.

EXAMPLE 18a

Tablets

The tablet composition was compounded from the following ingredients:

| | Parts |
|---|---|
| N - [1-(3,4 - (methylenedioxy-phenyl)propyl-(2)]-N'-(o-methyl-phenyl)-piperazine | 30 |
| Lactose | 70 |
| Corn starch | 93 |
| Secondary calcium phosphate | 47 |
| Soluble starch | 3 |
| Magnesium stearate | 3 |
| Colloidal silicic acid | 4 |
| Total | 250 |

Compounding procedure

The piperazine compound was intimately admixed with about one-half of each of the inert components except the soluble starch, the mixture was moistened with an aqueous solution of the soluble starch, and the moist mass was forced through a 1.5 mm. mesh screen. The moist granulate thus obtained was dried and admixed with the remainder of the inert components, and the mixture was pressed into 250 mgm. tablets. Each tablet contained 30 mgm. of the piperazine compound and, when administered perorally to a warm-blooded animal of about 60 kg. body weight requiring such treatment, produced very good central nervous system depressing effects.

EXAMPLE 19

Coated pills

The pill cores were compounded from the following ingredients:

| | Parts |
|---|---|
| N-[1-(5-indanyl)-propyl - (2)]-N'-(o-ethyl-phenyl)-piperazine | 40 |
| Corn starch | 80 |
| Lactose | 50 |
| Secondary calcium phosphate | 50 |
| Magnesium stearate | 3 |
| Soluble starch | 3 |
| Colloidal silicic acid | 4 |
| Total | 230 |

Compounding procedure

The ingredients were admixed and the mixture granulated in the same manner as in Example 18, and the final composition was pressed into 230 mgm. pill cores, which were then coated in conventional manner with a mixture consisting essentially of talcum, sugar and gum arabic. Each coated pill contained 40 mgm. of the piperazine compound and, when administered perorally to a warm-blooded animal of about 60 kg. body weight requiring such treatment, produced the same pharmacodynamic effect as a tablet of Example 18.

EXAMPLE 20

Tablets with additional spasmolytic ingredient

The tablet composition was compounded from the following ingredients:

|  | Parts |
|---|---|
| N - [1 - 3,4 - methylenedioxy-phenyl)-propyl-(2)]-N'-(o-ethyl-phenyl)-piperazine | 35 |
| (—)-N-scopolammonium-butylbromide | 25 |
| Lactose | 164 |
| Corn starch | 194 |
| Colloidal silicic acid | 14 |
| Polyvinylpyrrolidone | 6 |
| Magnesium stearate | 2 |
| Soluble starch | 10 |
| Total | 450 |

Compounding procedure

The piperazine compound and the scopolammonium compound were intimately admixed with about one-half of the required amounts of the inert carrier components except the soluble starch, the mixture was moistened with an aqueous solution of the soluble starch, and the moist mass was granulated by passing it through a 1.5 mm. mesh screen. The moist granulate was dried and then admixed with the remainder of the inert components, and the finished composition was pressed into 450 mgm. tablets. Each tablet contained 35 mgm. of the piperazine compound and 25 mgm. of scopolammonium compound and, when administered perorally to a warm-blooded animal of about 60 kg. body weight requiring such treatment, produced very good CNS-depressing and spasmolytic effects.

EXAMPLE 21

Suppositories

The suppository composition was compounded from the following ingredients:

|  | Parts |
|---|---|
| N-[1 - (3,4 - methylenedioxy-phenyl)-propyl-(2)]-N'-(p-acetyl-phenyl)-piperazine | 30 |
| Dipyrone | 10 |
| Lecithin | 2 |
| Cocoa butter | 1790 |
| Total | 1832 |

Compounding procedure

The cocoa butter was melted, and a mixture of the piperazine compound, the dipyrone and the lecithin was homogeneously distributed in the melted cocoa butter. The homogeneous composition was then poured into cooled suppository molds, each holding 1832 mgm. of the composition. Each suppository contained 30 mgm. of the piperazine compound and 10 mgm. of dipyrone and, when administered rectally to a warm-blooded animal of about 60 kg. body weight requiring such treatment, produced very good CNS-depressing, analgesic, antipyretic and antirheumatic effects.

Although the above dosage unit composition examples illustrate only three specific compounds of the instant invention as active ingredients, it should be understood that any other compound embraced by Formula I above or a non-toxic, pharmacologically acceptable acid addition salt thereof, in either the racemic or optically active form, may be substituted for the particular piperazine compound in Examples 18 through 21. Moreover, the amount of piperazine compound in these examples may be varied to achieve the dosage unit range set forth above, and the amounts and nature of the inert ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A racemic or optically active compound of the formula

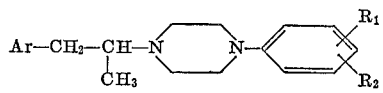

wherein

Ar is 3,4-methylenedioxy-phenyl, indanyl, naphthyl or 1,4-benzodioxanyl, and $R_1$ and $R_2$ are each hydrogen, halogen, amino, acetylamino, trifluoromethyl, alkyl of 1 to 4 carbon atoms, alkoxy or 1 to 4 carbon atoms, alkylcarbonyl of 1 to 4 carbon atoms or alkylthio of 1 to 4 carbon atoms, or a non-toxic, pharmacologically acceptable acid addition salt thereof.

2. A compound according to claim 1, which is racemic or optically active N-[1-(3',4'-methylenedioxyphenyl)-propyl - (2)]-N'-(o-ethyl-phenyl)-piperazine or a non-toxic, pharmacologically acceptable acid addition salt thereof.

3. A compound according to claim 1, which is racemic or optically active N-[1-(3',4'-methylenedioxy-phenyl)-propyl-(2)]-N'-(o,o'-dimethyl-phenyl)-piperazine or a non-toxic, pharmacologically acceptable acid addition salt thereof.

4. A compound according to claim 1, which is racemic or optically active N-[1-(3',4'-methylenedioxy-phenyl)-propyl-(2)]-N'-(o-methoxy-phenyl)-piperazine or a non-toxic, pharmacologically acceptable acid addition salt thereof.

5. A compound according to claim 1, which is racemic or optically active N-[1-(5'-indanyl)-propyl-(2)]-N'-(o-ethyl-phenyl)-piperazine or a non-toxic, pharmacologically acceptable acid addition salt thereof.

6. A compound according to claim 1, which is racemic or optically active N-[1-(β-naphthyl)-propyl-(2)]-N'-(o-ethyl-phenyl)-piperazine or a non-toxic, pharmacologically acceptable acid addition salt thereof.

7. A compound according to claim 1, which is racemic or optically active N-[1-(3',4'-methylenedioxy-phenyl)-propyl-(2)]-N'-(o-butoxy-phenyl)-piperazine or a non-toxic, pharmacologically acceptable acid addition salt thereof.

8. A compound according to claim 1, which is racemic or optically active N-[1-(3',4'-methylenedioxy-phenyl)-propyl-(2)]-N'-(m-trifluoromethyl-phenyl)-piperazine or a non-toxic, pharmacologically acceptable acid addition salt thereof.

9. A compound according to claim 1, which is racemic or optically active N-[1-(1',4'-benzodioxanyl-6')-propyl-(2)]-N'-(o-ethyl-phenyl)-piperazine or a non-toxic, pharmacologically acceptable acid addition salt thereof.

10. A compound according to claim 1, which is racemic or optically active N-[1-(3',4'-methylenedioxy-phenyl)-propyl-(2)]-N'-(o-methyl-phenyl)-piperazine or a non-toxic, pharmacologically acceptable acid addition salt thereof.

11. A compound according to claim 1, which is racemic or optically active N-[1-(3',4'-methylenedioxy-phenyl)-propyl-(2)]-N'-(p-methyl-phenyl)-piperazine or a non-toxic, pharmacologically acceptable acid addition salt thereof.

12. A compound according to claim 1, which is racemic or optically active N-[1-(3',4'-methylenedioxy-phenyl)-propyl-(2)]-N'-phenyl-piperazine or a non-toxic, pharmacologically acceptable acid addition salt thereof.

13. A compound according to claim 1, which is racemic or optically active N-[1-(3',4'-methylenedioxy-phenyl)-propyl-(2)]-N'-(p-acetyl-phenyl)-piperazine or a non-toxic, pharmacologically acceptable acid addition salt thereof.

14. A compound according to claim 1, which is racemic or optically active N-[1-,3',4'-methylenedioxy-phenyl)-propyl-(2)]-N'-(o-amino-phenyl)-piperazine or a non-toxic, pharmacologically acceptable acid addition salt thereof.

15. A compound according to claim 1, which is racemic or optically active N-[1-(3',4'-methylenedioxy-phenyl)-propyl-(2)]-N'-(o-acetamido-phenyl)-piperazine or a non-toxic, pharmacologically acceptable acid addition salt thereof.

16. A compound according to claim 1, which is racemic or optically active N-[1-(3',4'-methylenedioxy-phenyl)-propyl-(2)]-N'-(o-chloro-phenyl)-piperazine or a non-toxic, pharmacologically acceptable acid addition salt thereof.

References Cited
UNITED STATES PATENTS 3,119,826   1/1964   Regnier et al. _____ 260—268

ALEX MAZEL, Primary Examiner

R. V. RUSH, Assistant Examiner

U.S. Cl. X.R.

260—268 PH; 424—250

UNITED STATES PATENT OFFICE
CERTIFICATE OF CORRECTION

Patent No. 3,729,474             Dated April 24, 1973

Inventor(s) ANTON MENTRUP, KARL ZEILE, PETER DANNEBERG and KURT SCHROMM

It is certified that error appears in the above-identified patent and that said Letters Patent are hereby corrected as shown below:

Col. 2, line 18 - correct the formula to read

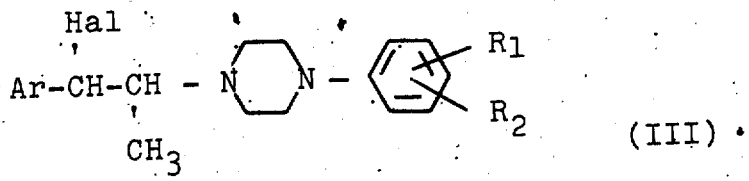

(III)

Col. 3, line 5 - correct the formula to read

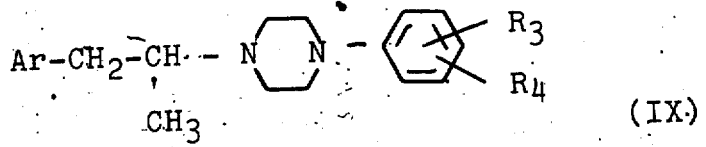

(IX)

Col. 3, line 46 - insert --(-- before "CH2"

Col. 3, line 75 - correct "1,21,973" to read --1,212,973--.

Signed and sealed this 14th day of May 1974.

(SEAL)
Attest:

EDWARD M.FLETCHER,JR.
Attesting Officer

C. MARSHALL DANN
Commissioner of Patents